June 5, 1951   F. A. ANDERSON   2,555,624
ATTACHMENT FOR MECHANICALLY AGITATING ICE CREAM
WHILE BEING FROZEN IN HOME FREEZERS
Filed Aug. 11, 1948
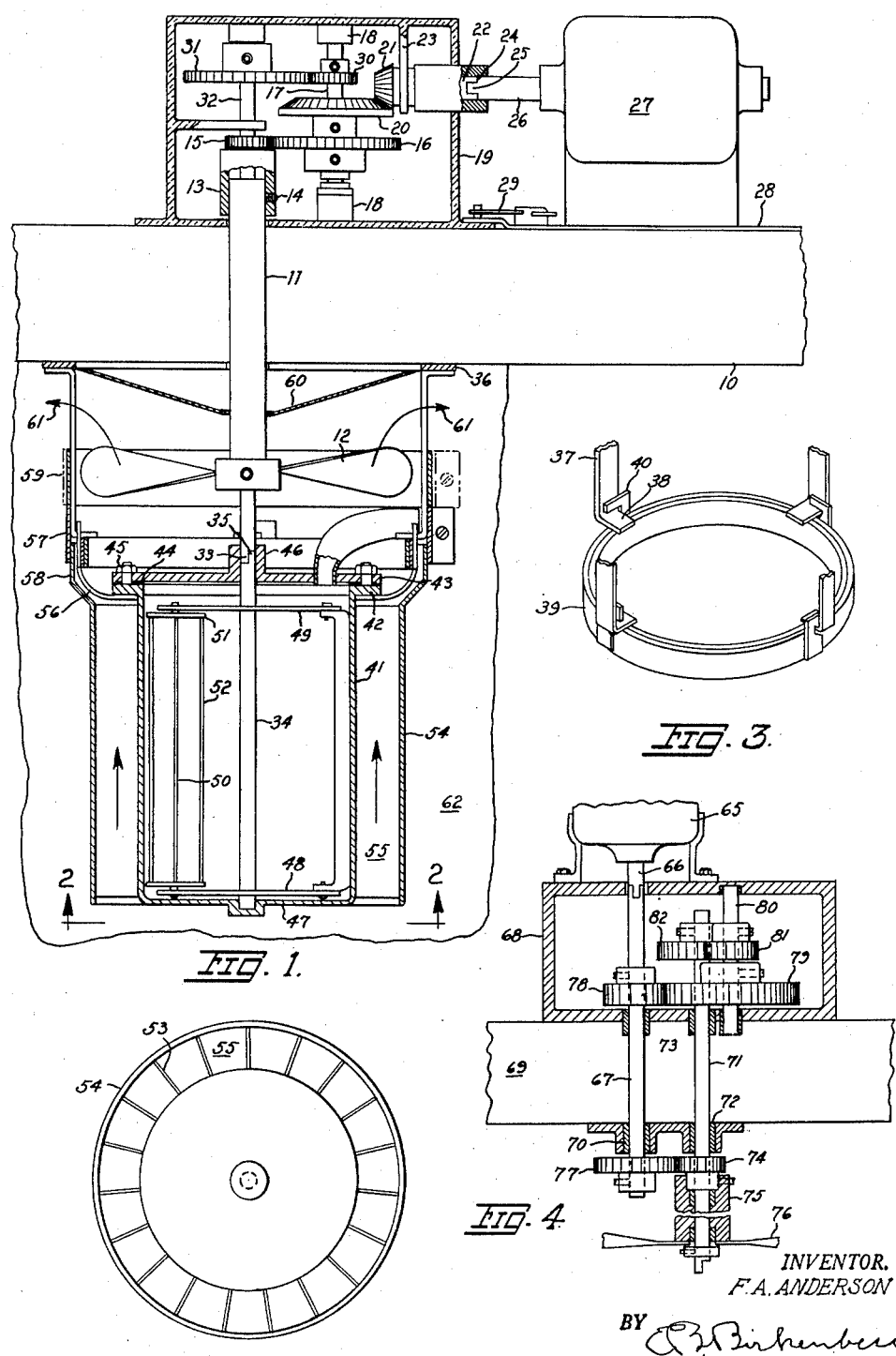
INVENTOR.
F. A. ANDERSON
BY
ATTORNEY Patented June 5, 1951

2,555,624

UNITED STATES PATENT OFFICE 2,555,624

ATTACHMENT FOR MECHANICALLY AGITATING ICE CREAM WHILE BEING FROZEN IN HOME FREEZERS

Frank A. Anderson, Portland, Oreg.

Application August 11, 1948, Serial No. 43,658

3 Claims. (Cl. 62—114)

This invention relates generally to refrigeration and particularly to an attachment for mechanically agitating ice cream while being frozen in a home freezer.

The main object of this invention is to provide an efficient and exceedingly simple form of mechanically agitated ice cream freezer in which the freezing capacity of the home freezer is employed.

The second object is to produce a device of the class described in which the device may be attached to or built into a "Deep Freeze" unit.

I accomplish these and other objects in the manner set forth in the following specification as illustrated in the accompanying drawing, in which:

Fig. 1 is a vertical section through one form of the device.

Fig. 2 is a bottom view taken along the line 2—2 in Fig. 1.

Fig. 3 is a perspective view of the locking device.

Fig. 4 is a fragmentary section through a modified form of the device.

Like numbers of reference refer to the same or similar parts throughout the several views.

Referring in detail to the drawing, there is shown the cover 10 of a common form of freezing cabinet such as is ordinarily employed for storing frozen foods in the home. Through the cover 10 extends a tubular shaft 11 on whose lower end is secured a fan 12. On the upper end of the tubular shaft 11 is secured a collar 13 by means of a setscrew 14. On the collar 13 is formed a pinion 15 which meshes with a gear 16 on the shaft 17 which journals in the bearings 18 supported by the housing 19. Also secured on the shaft 17 is a bevel gear 20 which meshes with the bevel pinion 21 on the stub shaft 22 which is carried by the housing 19 and the bracket 23. The stub shaft 22 is provided with the slotted end 24 into which extends the tongue 25 of the shaft 26 of the drive motor 27 which is mounted on the plate 28 which rests on the cover 10 and is held in place by means of the clamp 29 or in any other convenient manner.

On the shaft 17 is also secured a pinion 30 which meshes with the gear 31 secured on the shaft 32 which passes through the tubular shaft 11 and its end 33 extends below the fan 12. The purpose of this arrangement, of course, is merely to provide a higher speed for the fan 12 than is imparted to the agitator shaft 34 and end 35 which is drivably connected to the shaft 32.

Underneath the cover 10 is secured a ring 36 having the depending arms 37 whose ends 38 are inturned as shown in Fig. 3. Beneath the ends 38 is disclosed a circular band 39 to which is attached the upright hooks 40 which can engage the ends 38 and support the band 39 if properly turned or can be released therefrom by rotating the band 39 in the opposite direction.

The container 41 is of any desired size and is provided with the outturned flange 42 at its open end upon which rests the cover 43 provided with a gasket 44 and secured thereto by means of the bolts 45.

In the middle of the cover 43 is a bearing 46 within which journals the overlapping ends 33 and 35 of the shafts 32 and 34 respectively. The shaft 34 journals in the bottom 47 of the container 41 and carries thereon the plates 48 and 49, between which is mounted the agitator pivot 50 upon which journals the agitator blade frame 51 which supports the blades 52.

Surrounding the container 41 and spaced therefrom by means of the radial fins 53 is the cylindrical casing 54. The container 41, the casing 54 and the fins 53 form a plurality of air conducting channels 55 around the container 41. Extending downwardly from the band 39 are the inturned arms 56 which support the flange 42 of the container 42. A band clamp 57 is placed around the bell-shaped end 58 of the casing 54 and a second band clamp 59 is placed around the depending arms 37. These serve to insure all of the intake of the fan 12 passing upwardly through the channels 55.

A deflector disk 60 is placed around the shaft 11 to guide the air from the fan 12 outwardly in the direction indicated by the arrows 61.

The operation of this form of the device is as follows: A quantity of ice cream mix is placed in the container 41 which is then put into place and held there by rotation until the parts assume the position shown in Fig. 3. The cover 10 is then lowered, moving the entire container into the freezing compartment 62 beneath the cover 10 and the motor 27 operated which, through the reduction gearing 20 and 21, causes the agitator shaft 34 to revolve at the proper mixing speed while, through the over-drive gears 15 and 16 causes the fan 12 to revolve at a speed in excess of that of the motor 27.

Since heat from the mix within the container 41 is rapidly conducted to the fins 53, it follows that the large capacity of the freezer can be utilized to quickly carry away this heat, thereby producing a compact, fast operating and efficient form of home freezer.

In the form of the device shown in Fig. 4, the motor 65 is mounted on a vertical axis and its shaft 66 is drivably connected to the shaft 67 which journals in the housing 68 on top of the cover 69 and in the bearing 70 on the under side of the cover 69. Also extending through the cover 69 is the agitator shaft 71 which journals in the bearings 72 and 73 and has rotatably mounted thereon a driven pinion 74 to which is attached a hub 75 and the fan 76. On the shaft 67 is secured a gear 77 which meshes with the pinion 74, thereby producing an over-drive between the motor 65 and the fan 76. Within the housing 68, and secured on the shaft 67, is a pinion 78 which meshes with the gear 79 on the counter shaft 80. On the counter shaft 80 is a pinion 81 which meshes with a gear secured on the agitator shaft 71, thereby producing a reduction in speed from the motor 65 to one which is satisfactory for the agitator shaft 71.

The two forms of the device are identical in principle but differ mainly in the motor mounting and the details of the gearing.

I am aware that numerous forms of ice cream mixing machines have been constructed in the past. I, therefore, do not intend to cover such devices broadly but I do intend to cover all such forms and modifications thereof as fall fairly within the appended claims.

I claim:

1. An ice cream freezing unit having in combination a container having a plurality of ducts formed around the exterior thereof, means of suspending said container within a freezing cabinet, a fan for drawing air upwardly through said ducts and means for agitating the mix within said container.

2. An apparatus of the class described, the combination of a container having means for mounting same on the under side of a refrigerator cover, an electric motor mounted on the outside of said cover, an agitator inside said container drivable from said motor and a fan for circulating cold air from said refrigerator in contact with said container, characterized by having the agitator geared below motor speed and the fan geared above motor speed.

3. An apparatus of the class described, consisting of a cylindrical container adapted to be removably mounted within a refrigerator in a manner to extend into the freezing compartment thereof, an electric motor associated with said container, a transmission driven by said motor having two power take-offs, one of which is driven above motor speed and the other below motor speed, an agitator in said container driven by the slow speed take-off, a fan driven by said high speed take-off and a plurality of air ducts formed around said container through which air can be circulated from said freezing compartment along the exterior of said container.

FRANK A. ANDERSON.

REFERENCES CITED

The following references are of record in the file of this patent:

UNITED STATES PATENTS

| Number | Name | Date |
|---|---|---|
| 1,480,954 | Rice | Jan. 15, 1924 |
| 1,952,985 | Hopkes | Mar. 27, 1934 |
| 2,038,434 | Lipman | Apr. 21, 1936 |
| 2,055,735 | Stull | Sept. 29, 1936 |
| 2,150,233 | Martin | Mar. 14, 1939 |
| 2,265,867 | Sauer | Dec. 9, 1941 |
| 2,446,066 | Tate | July 27, 1948 |
| 2,488,668 | Knibb | Nov. 22, 1949 |